(12) United States Patent
Saito et al.

(10) Patent No.: US 7,827,144 B1
(45) Date of Patent: Nov. 2, 2010

(54) METHODS OF READING AND WRITING DATA

(75) Inventors: Yasushi Saito, Mountain View, CA (US); Svend Frolund, Aalborg (DK); Alistair Veitch, Mountain View, CA (US); Arif Merchant, Los Altos, CA (US); Susan Spence, Seattle, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 550 days.

(21) Appl. No.: 11/283,471

(22) Filed: Nov. 17, 2005

(51) Int. Cl.
*G06F 7/00* (2006.01)
(52) U.S. Cl. ...................................................... 707/638
(58) Field of Classification Search .................. 707/2, 707/3, 6, 7, 9, 10, 101, 102, 203, 204, 638
See application file for complete search history.

(56) References Cited

U.S. PATENT DOCUMENTS

| | | | |
|---|---|---|---|
| 5,212,788 A | 5/1993 | Lomet et al. | |
| 5,430,869 A | 7/1995 | Ishak et al. | |
| 5,452,445 A | 9/1995 | Hallmark et al. | |
| 5,504,900 A | 4/1996 | Raz | |
| 5,546,582 A | 8/1996 | Brockmeyer et al. | |
| 5,644,763 A | 7/1997 | Roy | |
| 5,701,480 A | 12/1997 | Raz | |
| 5,768,538 A | 6/1998 | Badovinatz et al. | |
| 5,787,459 A | 7/1998 | Stallmo et al. | |
| 5,799,305 A | 8/1998 | Bortvedt et al. | |
| 5,920,857 A | 7/1999 | Rishe et al. | |
| 5,953,714 A | 9/1999 | Abdullah | |
| 6,052,712 A | 4/2000 | Badovinatz et al. | |
| 6,148,295 A | 11/2000 | Megiddo et al. | |
| 6,170,063 B1 * | 1/2001 | Golding | 713/502 |
| 6,219,667 B1 | 4/2001 | Lu et al. | |
| 6,421,688 B1 | 7/2002 | Song | |
| 2003/0131068 A1 * | 7/2003 | Hoshino et al. | 709/216 |
| 2004/0210673 A1 * | 10/2004 | Cruciani et al. | 709/246 |
| 2004/0230596 A1 | 11/2004 | Veitch et al. | |
| 2004/0230624 A1 | 11/2004 | Frolund et al. | |
| 2004/0230862 A1 | 11/2004 | Merchant et al. | |
| 2005/0091450 A1 | 4/2005 | Frolund et al. | |
| 2005/0091451 A1 | 4/2005 | Frolund et al. | |
| 2005/0091556 A1 | 4/2005 | Frolund et al. | |
| 2006/0123212 A1 * | 6/2006 | Yagawa | 711/162 |

(Continued)

FOREIGN PATENT DOCUMENTS

EP   1160682 A1   12/2001

OTHER PUBLICATIONS

Khalil Amiri et al., Highly concurrent shared storage, 2000, Pittsburgh, PA.

(Continued)

*Primary Examiner*—Charles Rones
*Assistant Examiner*—Fazlul Quader

(57) ABSTRACT

An embodiment of a method of writing data includes issuing write messages to a replica set of storage devices. Write confirmations are received from at least a majority of the storage devices. An embodiment of a method reading data includes issuing read messages to a replica set of storage devices. Read confirmations are received from at least a first majority of the storage devices. Read commit messages are issued to the storage devices. Commit confirmations are received from at least a second majority of the storage devices.

36 Claims, 5 Drawing Sheets

U.S. PATENT DOCUMENTS

2007/0192542 A1  8/2007  Frolund et al.
2007/0192544 A1  8/2007  Frolund et al.

OTHER PUBLICATIONS

Khalil Amiri et al., Highly concurrent shared storage, The 20th International Conference on Distributed Computing Systems, 2000, pp. 298-307, IEEE Computer Society, Washington DC.

Hagit Attiya et al., Sharing Memory Robustly in Message-Passing Systems (Extended Abstract), Proceedings of the Ninth Annual ACM Symposium on Principles of Distributed Computing, 1990, pp. 363-375, ACM Press, New York, NY.

Hagit Attiya et al., Sharing Memory Robustly in Message-Passing Systems, Journal of the Association for Computing Machinery, 1995, 42(1):124-142, ACM Press, New York, NY.

Steven Berson et al., Randomized Data Allocation for Real-time Disk I/0, 1996, Marina Del Rey, CA.

Partha Dutta et al., An Efficient Universal Construction for Message-Passing Systems (Preliminary Version), Technical Report EPFL/IC/20002/28, 2002, Swiss Federal Institute of Technology, Lausanne, Switzerland.

Svend Frølund et al., Building Storage Registers from Crash-Recovery Processes, HP Labs Technical Report HPL-SSP-2003-14, 2003, Hewlett-Packard Development Company, L.P., Palo Alto, CA. <http://www.hpl.hp.com/research/ssp/papers/ssp-2003-14.pdf>.

Svend Frølund et al., Fab: enterprise storage systems on a shoestring, Proceedings of HOTOS IX: The Ninth Workshop on Hot topics in Operating Systems, 2003, pp. 169-174, The USENIX Association, Berkeley, CA.

Svend Frølund et al., A Decentralized Algorithm for Erasure-Coded Virtual Disks, Jun. 28, 2004, Palo Alto, CA.

Garth R. Goodson et al., Decentralized Storage Consistency via Versioning Servers, Technical Report CMU-CS-02-180, 2002, Carnegie Mellon University, Pittsburg, PA, Sep. 2002.

Steven Hand et al., Mnemosyne: Peer-to-Peer Steganographic Storage, Electronic Proceedings for the 1st International Workshop on Peer-to-Peer Systems, 2002, Rice University, Houston TX. <http://www.cs.rice.edu/Conferences/IPTPS02/107.pdf>.

Maurice P. Herlihy et al., Linearizability: A Correctness Condition for Concurrent Objects, ACM Transactions on Programming Languages and Systems, 1990, 12(3):463-492, ACM Press, New York, NY.

Hui-I Hsiao et al., Chained Declustering: A New Availability Strategy for Multiprocessor Database machines, 1990, University of Wisconsin, Madison, WI.

Hans-Peter Kriegel et al., Managing Intervals Efficiently in Object-Relational Databases, Proceedings 2000 VLDB Conference, 2000, pp. 407-418, Morgan Kaufmann Publishers, San Francisco, CA.

John Kubiatowicz et al., Oceanstore: An Architecture for Global-Scale Persistent Storage, Proceedings of the Ninth International Conference on Architectural Support for Programming Languages and Operating Systems, 2000, pp. 190-201, ACM Press, New York, NY.

Leslie Lamport, On Interprocess Communication, 1985, Mountain View, CA. <http://research.microsoft.com/users/lamport/pubs/interprocess.pdf>.

Leslie Lamport, The Part-Time Parliament, 2000, Mountain View, CA.

Edward K. Lee et al., Petal: Distributed Virtual Disks, Proceedings of the Seventh International Conference on Architectural Support for Programming Languages and Operating Systems, 1996, pp. 84-92, ACM Press, New York, NY.

Barbara Liskov et al., Replication in the Harp File System, 1991, Cambridge, MA.

Nancy Lynch et al., Robust emulation of shared memory using dynamic quorum-acknowledged broadcasts, 1996, Cambridge, MA.

Nancy Lynch et al., Rambo: A Reconfigurable Atomic Memory Service for Dynamic Networks, Distributed Computing: 16th International Conference, 2002, pp. 173-190, Springer-Verlag, Heidelberg, Germany.

Dahlia Malkhi et al., Byzantine Quorum Systems, 1998, Florham Park, NJ.

Arif Merchant et al., Analytic Modeling of Clustered RAID with Mapping Based on Nearly Random Permutation, IEEE transactions on Computers, 1996, 45(3):367-373, IEEE Computer Society Press, Washington DC.

Gabriel Mizrahi, The Hashing Approach to the Internet File System Problem, M.A. Thesis, Department of Mathematics, 2001, University of Haifa, Israel, Nov. 2001.

James S. Plank, A Tutorial on Reed-Solomon Coding for Fault-Tolerance in RAID-like Systems, Software—Practice and Experience, 1997, 27(9):995-1012, John Wiley & Sons, Ltd., Hoboken, NJ.

Yasushi Saito et al., FAB: Building Distributed Enterprise Disk Arrays from Commodity Components, Oct. 7, 2004, Palo Alto, CA.

Jose Renato Santos et al., Comparing Random Data Allocation and Data Striping in Multimedia Servers, Proceedings of the 2000 ACM SIGMETRICS international conference on Measurement and modeling of computer systems, 2000, pp. 44-55, ACM Press, New York, NY.

Robert H. Thomas, A Majority Consensus Approach to Concurrency Control for Multiple Copy Databases, ACM transactions on Database Systems, 1979, 4(2):180-209, ACM Press, New York, NY.

Hakim Weatherspoon et al., Erasure Coding vs. Replication: A Quantitative Comparison, 2002, Berkeley CA.

Avishai Wool, Quorum Systems in Replicated Databases: Science or Fiction?, Bulletin of the IEEE Computer Society Technical Committee on Data Engineering, 21 (4):3-11, 1998, IEEE Computer Society Press, Washington DC.

Aguilera, M.K. et al, Strict linearizability and the power of aborting, HP Labs Tech. Report HPL 2003-241, Dec. 8, 2003, Palo Alto, CA (25 pages).

U.S. Appl. No. 11/357,815, Office Action dated May 14, 2009, pp. 1-7.

U.S. Appl. No. 11/357,815, Office Action dated Apr. 7, 2008, pp. 1-7 with attachments.

U.S. Appl. No. 11/357,776, Office Action dated Apr. 6, 2009, pp. 1-7 with attachments.

* cited by examiner

```
1:  when receive (WRITEREQ, newTs, val)
2:      Send (WRITE, newTs, val) to Replicas
3:  end when
4:  when receive (WRITE-REPLY, ts, OK) from node n
5:      wreplies[ts][n] ← OK
6:      acknodes = {n|(n → OK) ∈ wreplies[ts]}
7:      if IsQuorum(|acknodes|, Replicas) then
8:          return (WRITE-COMPLETE, ts, OK)
9:      end if
10: end when
11: when WRITE with timestamp ts times out
12:     return (WRITE-COMPLETE, ts, NOK)
13: end when
14: procedure IsQuorum(part, whole)
15:     return |part ∩ whole| > |whole|/2
16: end 21: when receive (READREQ, newRts)
22:     Send (READ, newRts) to Replicas
23: end when
24: when receive (READ-REPLY, rts, OK, val, ts) from node n
25:     rvalue = rvalues[rts]
26:     rvalue[n] ← (val, ts)
27:     rreplies[rts][n] ← OK
28:     acknodes = {n|(n → OK) ∈ rreplies[rts]}
29:     if IsQuorum(|acknodes|, Replicas) then
30:         (cts', val') = max(∪{rvalue[n]})
31:         rretval[rts] ← val'
32:         for each n ∈ Replicas do
33:             (orgCts, orgVal) = max(rvalue[n])
34:             Send (COMMIT, rts, orgCts, val') to n
35:         end for
36:     end if
37: end when
38: when receive (COMMIT-REPLY, ts, OK) from node n
39:     creplies[ts][n] = OK
40:     acknodes = {n|(n → OK) ∈ creplies[ts]}
41:     if IsQuorum(|acknodes|, Replicas) then
42:         return (READ-COMPLETE, ts, OK, rretval[ts])
43:     end if
44: end when
45: when READ or COMMIT with timestamp ts times out
46:     return (READ-COMPLETE, ts, NOK)
47: end when
```

FIG. 5A

```
550 ⎰ 560 ⎰ 51: when receive (WRITE, newTs, newVal)
    ⎱     ⎱ 52:     if newTs < max(rts, wts) then
                53:         reply (WRITE-REPLY, newTs, ERROR)
                54:     else
                55:         wts ← newTs
                56:         value ← newVal
                57:         reply (WRITE-REPLY, newTs, OK)
                58:     end if
                59: end when 570 ⎰ 61: when receive (READ, newTs)
            ⎱ 62:     if newTs < max(rts, wts) then
                63:         reply (READ-REPLY, newTs, ERROR)
                64:     else
                65:         rts ← newTs
                66:         reply (READ-REPLY, newTs, OK, value, wts)
                67:     end if
                68: end when 580 ⎰ 71: when receive (COMMIT, newRts, orgWts, newVal)
            ⎱ 72:     if newRts ≥ rts and orgWts ≥ wts then
                73:         wts ← newRts
                74:         value ← newVal
                75:         reply (COMMIT-REPLY, newRts, OK)
                76:     else
                77:         reply (COMMIT-REPLY, newRts, NOK)
                78:     end if
                79: end when
```

FIG. 5B

METHODS OF READING AND WRITING DATA

FIELD OF THE INVENTION

The present invention relates to the field of data storage. More particularly, the present invention relates to the field of data storage where a fault tolerant algorithm improves data accessibility.

BACKGROUND OF THE INVENTION

A critical component of computer systems is data storage. The data storage can be divided conceptually into an individual user's data storage, which is attached to the individual's computer, and network based data storage typically intended for multiple users.

One type of network based storage device is a disk array. The disk array includes at least one controller coupled to an array of disks. Typically, each of the disks of the disk array is hot swappable, which allows a disk to be replaced without turning off the disk array.

Often the network based storage must meet various performance requirements such as data reliability. One way of providing high reliability is data replication. For a disk array employing data replication, one or more additional copies of data are stored on one or more separate disks. If one of the disks holding a copy of the data fails, the data is still accessible on at least one other disk. Further, because of the hot swappable feature of the disk array, a failed disk can be replaced without turning off the disk array. Once the failed disk has been replaced, the lost copy of the data can be restored.

As an alternative to the disk array, researchers have been exploring replicated data storage across a plurality of independent storage devices. Each of the independent storage devices includes a CPU and one or more disks. A potential advantage of the plurality of independent storage devices includes an ability to locate each of the independent storage devices in separate physical locations. Another potential advantage of the array of independent storage devices is lower cost. The lower cost can result from mass production of the independent storage devices as commodity devices and from elimination of the hot swappable feature of the disk array.

In "FAB: Enterprise storage systems on a shoestring," Proc. of HotOS IX: The 9th Workshop on Hot Topics in Operating Systems, May 18, 2003, Frolund et al. teach methods of writing and reading replicated data stored across a plurality of independent storage devices. The method of writing the data includes two phases of communication (i.e., two rounds of communication) between a coordinator and a plurality of storage devices. In a pre-write phase (i.e., the first phase), the storage devices recognize a new ongoing write and promise not to accept an earlier write request. In a write phase (i.e., the second phase), the storage devices actually write the data. The method of reading the data takes place in a single phase provided that a majority of the storage devices indicate that they hold a consistent version of the data.

Since the method of reading the data takes place in a single phase, it operates efficiently when a workload is read intensive. When a workload for the plurality of storage devices is write intensive, it would be desirable to write the data in a single phase of communication while maintaining consistency of the data stored across the storage devices. Further, it would be desirable to be able to read the data that has been written with the single phase of communication in a way that maintains the consistency of the data stored across the storage devices.

SUMMARY OF THE INVENTION

The present invention includes methods of writing and reading data. According to an embodiment, a method of writing data begins with a first step of generating a timestamp. In a second step, write messages are issued to a replica set of storage devices. Each write message includes the data and the timestamp. In a third step, write confirmations are received from at least a majority of the storage devices of the replica set. Each write confirmation indicates that the timestamp is no earlier than a most recent version of a write timestamp, that the timestamp is no earlier than a most recent version of a read timestamp, and that the timestamp has been saved as a new version of the write timestamp.

According to an embodiment, a method of reading data begins with a first step of generating a timestamp. In a second step, read messages are issued to storage devices of a replica set. Each read message includes the timestamp. In a third step, read confirmations are received from at least a first majority of the storage devices of the replica set. Each read confirmation includes a write timestamp and a corresponding version of the data. The read confirmations indicate that the timestamp is no earlier than the write timestamp for the data, that the timestamp is no earlier than a most recent version of a read timestamp for the data, and that the timestamp has been saved as a new version of the read timestamp for the data. In a fourth step, read commit messages are issued to the storage devices of the replica set. Each read commit message includes the timestamp, a most recent version of the write timestamp selected from write timestamps provided in the read confirmations, and the corresponding version of the data. In a fifth step, commit confirmations are received from at least a second majority of the storage devices of the replica set. Each commit confirmation from a storage device indicates that the timestamp is no earlier than the most recent version of the read timestamp, that the most recent version of the write timestamp is no earlier than a local version of the write timestamp, that the corresponding version of the data has been saved, and that the timestamp has been saved as a newer version of the write timestamp.

These and other aspects of the present invention are described in more detail herein.

BRIEF DESCRIPTION OF THE DRAWINGS

The present invention is described with respect to particular exemplary embodiments thereof and reference is accordingly made to the drawings in which:

FIGS. 5A and 5B provide pseudo code embodiments of methods of writing and reading data of the present invention.

DETAILED DESCRIPTION OF A PREFERRED EMBODIMENT

Embodiments of the present invention include methods of writing and reading data in a distributed storage system. The method of writing data may execute in a single phase and the method of reading data may execute in two phases. Execution of read and write requests may complete when at least a majority of the storage devices provide confirmation, which allows continuous accesses to the data even in the presence of device and network failures. When failures occur, the methods of writing and reading data may recover during future instances of reading or writing the data and such recovery need not employ a lock-step synchronization. Embodiments of the methods of reading and writing the data use timestamps to ensure consistent data access even when clients access data concurrently. Embodiments of the methods of writing and reading the data described herein provide steps for a single unit of data (e.g., a data block). Multiple instances of the methods may be employed for multiple data units.

Figure 1:
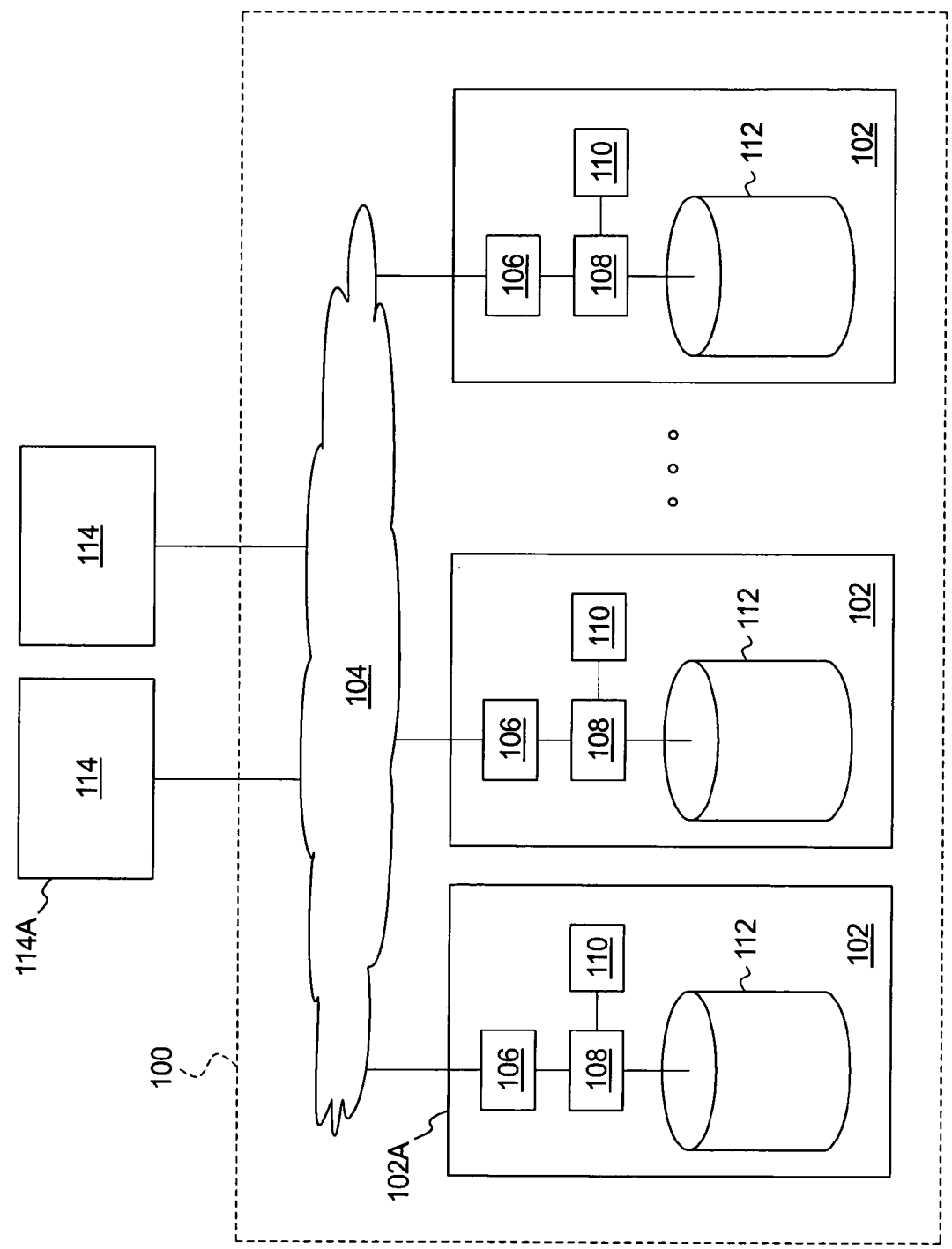
FIG. 1 schematically illustrates a distributed storage system that employs methods of writing and reading data in accordance with embodiments of the present invention.

An embodiment of a distributed storage system that employs methods of writing and reading data of the present invention is illustrated schematically in FIG. 1. The distributed storage system 100 comprises a plurality of storage devices 102, which are coupled by a network (e.g., a LAN—local area network) 104. In an embodiment, each of the storage devices 102 comprises a network interface 106, a processor 108, a NVRAM (non-volatile random access memory) 110, and storage 112, which are coupled together. Preferably, the storage 112 within each storage device 102 comprises one or more disks. Alternatively, the storage 112 within each of one or more of the storage devices 102 comprises some other storage media such as a tape and a tape drive. One or more clients 114, which are coupled to the network 104, issue read and write requests to the distributed storage system 100.

The distributed storage system 100 employs replication to reliably store data. A replication technique employed by the primary storage 101 replicates data blocks across a replica set of the storage devices 102 (e.g., three of the storage devices 102).

Typically, the distributed storage system 100 may be configured with anywhere from a few of the storage devices 102 to hundreds or more of the storage devices 102. The distributed storage system 100 may store multiple logical volumes, where groups of the storage devices store the logical volumes. Each logical volume may be divided into segments, which are units of data distribution within the storage system 100. Typically, segments are sized at 1 GB but may be smaller or larger.

For example, if the primary storage 101 employs three-way replication and 1 GB segments, a first group of three of the storage devices 102 store a first 1 GB segment, a second group of three of the storage devices 102 store a second 1 GB segment, and so forth. Each of the storage devices 102 in the first group store the first 1 GB segment; and each of the storage devices 102 in the second group store the second 1 GB segment.

Typically, clients 114, which are coupled to the network 104, issue write and read requests to the distributed storage system 100. The clients 114 may be hosts that are acting on behalf of other clients. Typically, a particular client 114A issues a write request to a particular storage device 102A requesting that data included within the request be written to a particular logical volume at a particular offset within the logical volume. The particular storage device 102A, which may have been randomly chosen, acts as a coordinator for the write request. Any storage device 102 may act as a coordinator. So, the coordinator may or may not be one of the storage devices 104 that hold the volume or the segment that includes the data. Alternatively, the client 114, another computer, or a group of computers coupled to the network 104 acts as the coordinator.

Figure 2:
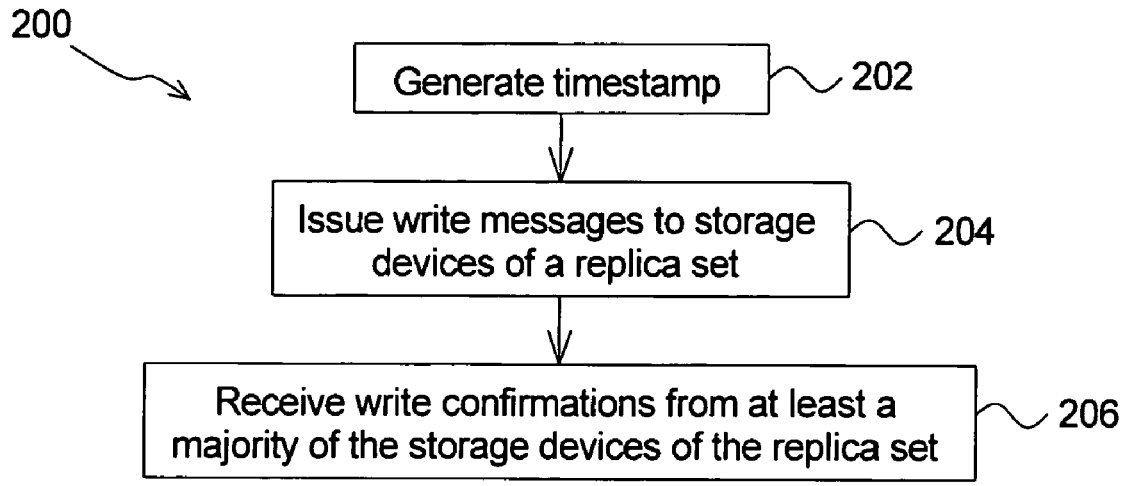
FIG. 2 illustrates an embodiment of a method of writing data of the present invention as a flow chart.

An embodiment of a method of writing data of the present invention is illustrated as a flow chart in FIG. 2. The method 200 begins with a first step 202 of generating a timestamp. The first step 202 of generating the timestamp may be performed by a coordinator (e.g., the coordinator 102A of the distributed storage system 100 of FIG. 1) or it may be performed by a client (e.g., the client 114A of the distributed storage system) that is providing the data to the coordinator. Preferably, each timestamp generated is unique so that ties may be avoided. For example, unique timestamps may include a time and an identifier of the computing entity that generated the timestamp.

In a second step 204, the coordinator issues write messages to a replica set of storage devices (e.g., a replica set of three of the storage devices 102 of the distributed storage system 100). The coordinator may be one of the storage devices of the replica set, which means that the coordinator issues a write message to itself. Or, the coordinator may be a separate computing entity from the storage devices of the replica set. Each write message includes the data and the timestamp.

In a third step 206, the coordinator receives write confirmations from at least a majority of the storage devices of the replica set. Each write confirmation indicates that the timestamp is no earlier than a most recent version of a write timestamp wts, that the timestamp is no earlier than a most recent version of a read timestamp rts, and that the timestamp has been saved as a newer version of the write timestamp wts. Following the third step 206, the coordinator may provide a write confirmation to the client. The write timestamp wts and the read timestamp rts are discussed more fully below.

Figure 3:
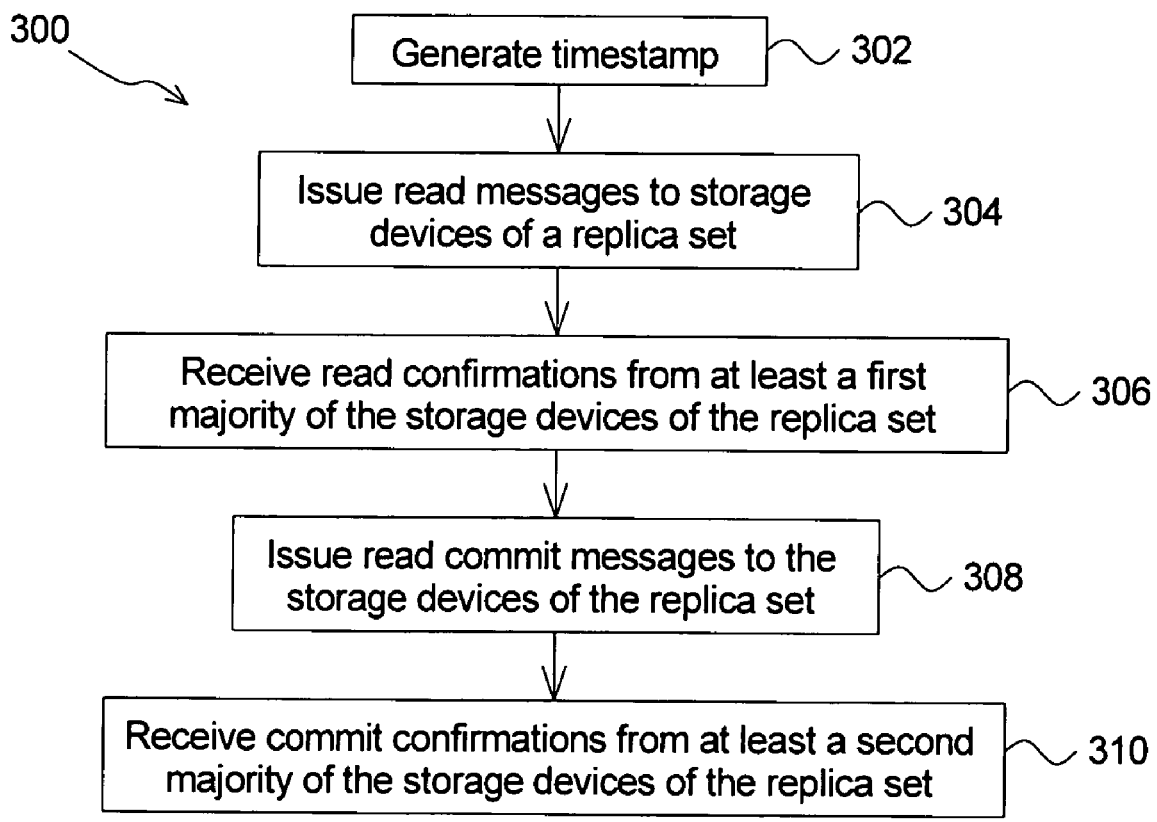
FIG. 3 illustrates an embodiment of a method of reading data of the present invention as a flow chart.

An embodiment of a method of reading data of the present invention is illustrated as a flow chart in FIG. 3. The method 300 begins with a first step 302 of generating a timestamp. The first step 302 of generating the timestamp may be performed by a coordinator or it may be performed by a client that is requesting the data from the coordinator. Preferably, each timestamp generated is unique so that ties may be avoided. For example, unique timestamps may include a time and an identifier of the computing entity that generated the timestamp.

In a second step 304, the coordinator issues read messages to storage devices of a replica set. Each read message includes the timestamp. The coordinator may be one of the storage devices of the replica set or it may be some other computing entity such as a storage device outside of the replica set or a client.

In a third step 306, the coordinator receives read confirmations from at least a first majority of the storage devices of the replica set. Each read confirmation includes a write timestamp wts and a corresponding version of the data. The read confirmations indicate that the timestamp is no earlier than the write timestamp wts, that the timestamp is no earlier than a read timestamp rts, and that the timestamp has been saved as a new version of the read timestamp rts.

In a fourth step 308, the coordinator issues read commit messages to the storage devices of the replica set. Each read commit message includes the timestamp, a most recent version of the write timestamp wts selected from the write timestamps wts provided in the read confirmations, and the corresponding version of the data.

In a fifth step 310, the coordinator receives commit confirmations from a second majority of the storage devices of the replica set. The second majority of the storage devices may include the storage devices of the first majority or it may include storage devices outside of the first majority. Of course, since each majority includes more than half of the storage devices of the replica set, the first and second majorities both include at least one particular storage device. For example, if a replica set includes three storage devices and the first majority is the first and second storage devices, the second majority includes at least either the first or second storage device. Each commit confirmation indicates that the timestamp is no earlier than the most recent version of the read timestamp, that the most recent version of the write timestamp is no earlier than a local version of the write timestamp, that the corresponding version of the data has been saved, and that the timestamp has been saved as a newer version of the write timestamp.

The methods of writing and reading the data, 200 and 300 (FIGS. 2 and 3), associate the write and read timestamps, wts and rts, with each unit of replicated data. The write timestamp wts indicates the time at which the replica was last written. The read timestamp rts indicates the time at which the newest ongoing "read" request was issued by a client or received by a coordinator. At a high level, the read timestamp rts ensures that no read requests proceed in parallel while the write timestamp wts ensures that a later version of the data is not overwritten by an earlier version of the data.

The methods of writing and reading the data, 200 and 300, provide efficient operation of a distributed storage system (e.g., the distributed storage system 100 of FIG. 1) when the distributed storage system employs replication and a workload is write intensive since the method 200 of writing the data employs a single phase of write messages and write confirmations while the method 300 of reading the data employs two phases of messages and replies.

Figure 4:
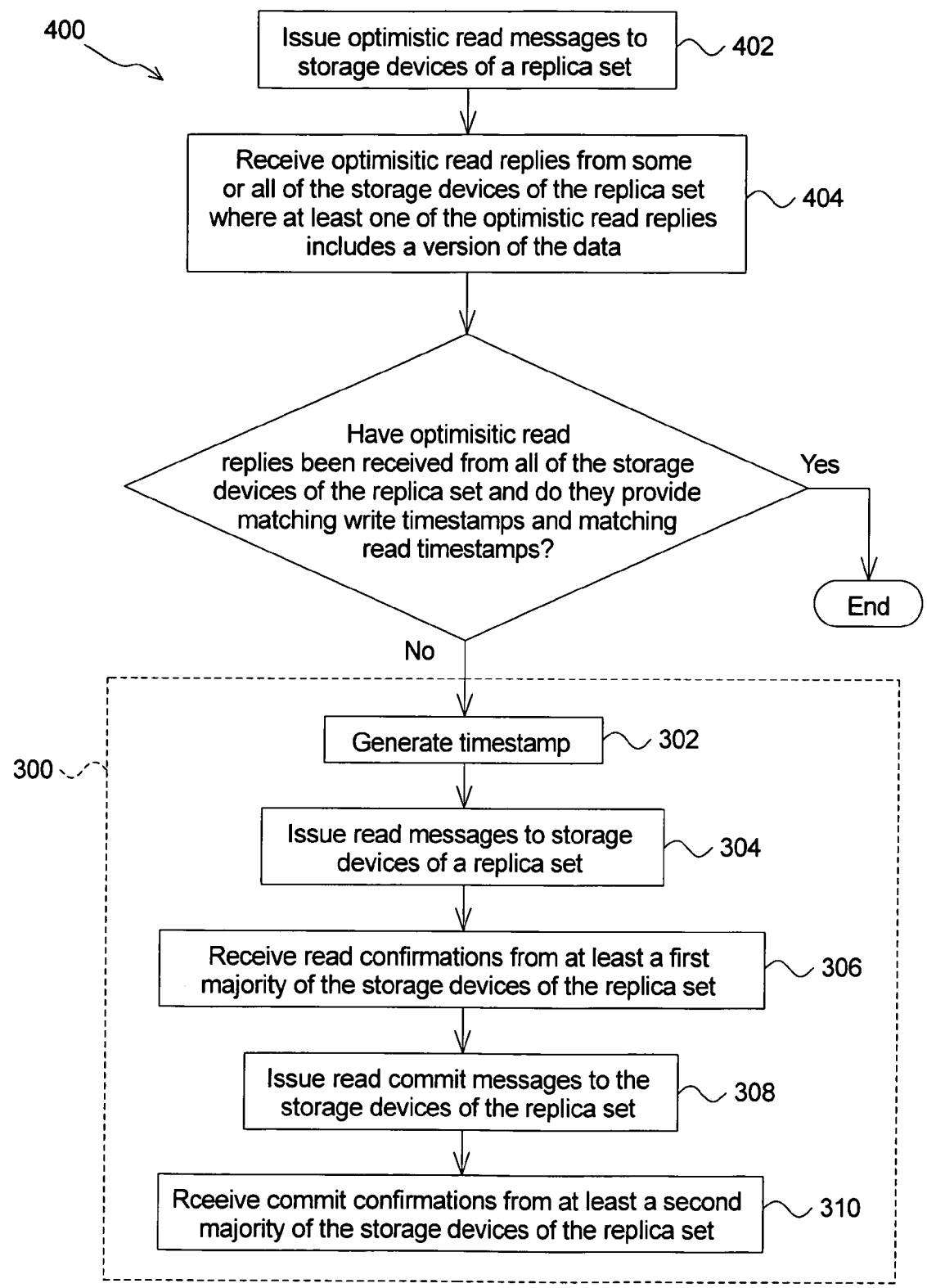
FIG. 4 illustrates another embodiment of a method of reading data of the present invention as a flow chart.

Another embodiment of a method of reading data of the present invention is illustrated as a flow chart in FIG. 4. The method 400 begins with a first step 402 of a coordinator issuing optimistic read messages to storage devices of a replica set. At least one of the optimistic read messages requests a write timestamp wts, a read timestamp rts, and the data. Preferably, a single optimistic read message requests the write timestamp wts, the read timestamp rts, and the data. Alternatively, multiple optimistic read messages request the write timestamp wts, the read timestamp rts, and the data. Remaining optimistic read messages request the write timestamp wts and the read timestamp rts.

In a second step 404, the coordinator receives optimistic read replies from some or all of the storage devices of the replica set. If the coordinator receives the optimistic read replies from at least all of the storage devices of the replica set and the optimistic read replies provide matching write timestamps and matching read timestamps, the coordinator may then provide the data to a client.

If the coordinator receives optimistic read replies from less than all of the storage devices of the replica set or at least one of the optimistic read replies includes a non-matching write timestamp or at least one of the optimistic read replies includes a non-matching read timestamp, the coordinator performs the method 300 of reading the data.

The method 400 improves performance of the distributed storage system in the common situation of receiving the optimistic read replies from all of the storage devices of the replica set with the optimistic read replies providing the matching write timestamps and the matching read timestamps. In the case of a failure or a concurrent read request, the method 400 decreases performance because the method 400 takes three phases rather than the two phases of the method 300.

Embodiments of methods of writing and reading data of the present invention are provided as pseudo code in FIGS. 5A and 5B. FIG. 5A provides a coordinator algorithm 500 for the embodiments and FIG. 5B provides a storage device algorithm 550. According to the embodiments, a coordinator executes various portions of the coordinator algorithm 500 depending upon whether data is written or read. The coordinator may be a storage device of the distributed storage system or a client of the distributed storage system or some other computing entity that is part of the distributed storage system or coupled to the distributed storage system. Each storage device of a replica set executes various portions of the storage device algorithm 550 in response to messages issued by the coordinator. The coordinator and storage device algorithms, 500 and 550, provide operations for a single data item. Multiple data items (e.g., a logical disk with multiple blocks) may be written or read by running multiple instances of appropriate portions of the coordinator and storage device algorithms, 500 and 550, in parallel.

Each storage device of a replica set keeps a set of persistent variables for each unit of data that include data value, a write timestamp wts, and a read timestamp rts. The data value is the current value of a replicated data item. The write timestamp wts is the timestamp of the most recent write request accepted by a storage device. The read timestamp rts is the timestamp of the most recent read request received by a storage device.

An embodiment of writing data of the present invention comprises the coordinator executing a coordinator write procedure 510 (FIG. 5A), which calls a storage device write procedure 560 (FIG. 5B). In lines 1 to 3 of the coordinator write procedure 510, the coordinator issues write messages to the storage devices of a replica set upon receiving a new timestamp newTs and data val from a client. Alternatively, the coordinator may generate the new timestamp newTs.

In response, the storage devices of the replica set execute the storage device write procedure 560. In line 52, each storage device of the replica set determines whether the new timestamp newTs is earlier than the write and read timestamps, wts and rts. If so, the storage device sends an error response in line 53. If not, the storage device saves the new timestamp newTs as a most recent version of the write timestamp wts, saves the new version of the data newVal as the data value, and provides a write reply to the coordinator that includes the new timestamp newTs in lines 55-57.

The coordinator waits at line 4 of the coordinator write procedure 510 for the write replies from the storage devices of the replica set. In lines 5 through 13, the coordinator write procedure 510 determines whether at least a majority of the storage devices (i.e., a quorum of the storage devices) have provided write confirmations by calling the IsQuorum procedure of lines 14 through 16. If at least the majority of write confirmations are received by the coordinator before a timeout limit, the coordinator sends an acknowledgment of the successful write to the client in line 8. If not, the coordinator sends an error message to the client in line 12.

An embodiment of reading data of the present invention comprises the coordinator executing a coordinator read procedure 520 (FIG. 5A), which calls storage device read and commit procedures, 570 and 580 (FIG. 5B). In lines 21 to 23 of the coordinator read procedure 520, the coordinator issues read messages to the storage devices of a replica set upon receiving a read request and a new read timestamp newRts from a client. Alternatively, the coordinator may generate the new read timestamp newRts.

In response, the storage devices of the replica set execute the storage device read procedure 570. In line 62, each storage device determines whether the new timestamp newTs is earlier than the read timestamp rts or the write timestamp wts. If so, the storage device returns an error message to the coordinator in line 63. If not, the storage device saves the new timestamp newTs as a most recent version of the read timestamp rts and provides a read reply that includes the new timestamp newTs, a confirmation that the condition of line 62 was met, the write timestamp wts, and the data value.

The coordinator waits at line 24 or the coordinator read procedure 520 for the read replies from the storage devices of the replica set. In line 25 to 29, the coordinator read procedure 520 determines whether a majority of the storage devices have provided confirmations that the condition of line 62 was not met. If so, the coordinator read procedure 520 issues commit messages to the storage devices of the replica set that include the read timestamp rts, a most recent version of the write timestamp orgCts provided in the read replies, and a corresponding version of the data val.'

In response, the storage devices of the replica set execute the storage device commit procedure 580. In line 72, each storage device determines whether read timestamp newRts is no earlier than a local version of the read timestamp rts and whether the write timestamp orgCts is no earlier than a local version of the write timestamp wts. If so, the storage device save the read timestamp newRts as a most recent version of the write timestamp wts in line 73, saves the data new Val in line 75, and returns a commit reply to the coordinator that indicates successful completion of the storage device commit procedure 580 in line 76. If not, the storage device sends a commit reply that includes an error message to the coordinator in line 77.

The coordinator waits at line 38 of the coordinator read procedure 520 for the commit replies from the storage devices of the replica set. If a majority of commit replies are received that indicate successful completion of the storage device commit procedure 580, the coordinator provides the data rretval[ts] to the client in line 42. If not, the coordinator sends an error message to the client in line 46.

The foregoing detailed description of the present invention is provided for the purposes of illustration and is not intended to be exhaustive or to limit the invention to the embodiments disclosed. Accordingly, the scope of the present invention is defined by the appended claims.

What is claimed is:

1. A computer-implemented method of writing data comprising the steps of:
    generating a timestamp;
    issuing write messages to a replica set of storage devices, each write message including the data and the timestamp; and
    receiving write confirmations from at least a majority of the storage devices of the replica set, each write confirmation indicating that the timestamp is no earlier than a most recent version of a write timestamp, that the timestamp is no earlier than a most recent version of a read timestamp, and that the timestamp has been saved as a new version of the write timestamp.

2. The method of claim 1 wherein a coordinator performs the steps of issuing the write messages and receiving the write confirmations.

3. The method of claim 2 wherein the coordinator is one of the storage devices of the replica set.

4. The method of claim 2 wherein generating the timestamp comprises receiving, by the coordinator, the timestamp from a client, the method further comprising receiving the data from the client.

5. The method of claim 2 wherein the coordinator performs the step of generating the timestamp.

6. The method of claim 2 further comprising the coordinator receiving the data from a client.

7. The method of claim 6 wherein, upon receiving the write confirmations from at least the majority of the storage devices of the replica set, the coordinator issues a write completion message to the client.

8. The method of claim 1 further comprising generating a new timestamp and issuing read messages to the storage devices of the replica set, each read message including the new timestamp.

9. The method of claim 8 wherein a write coordinator issues the write messages and receives the write confirmations.

10. The method of claim 9 wherein generating the new timestamp comprises receiving the new timestamp from a client, wherein a read coordinator issues the read messages.

11. The method of claim 9 wherein a read coordinator generates the new timestamp and issues the read messages.

12. The method of claim 11 wherein the read coordinator is not the write coordinator.

13. The method of claim 8 further comprising receiving read confirmations from at least a second majority of the storage devices of the replica set, each read confirmation including a write timestamp and a corresponding version of the data, the read confirmations indicating that the new timestamp is no earlier than the write timestamp for the data, that the new timestamp is no earlier than a most recent version of a read timestamp for the data, and that the new timestamp has been saved as a new version of the read timestamp for the data.

14. The method of claim 13 further comprising issuing read commit messages to the storage devices of the replica set.

15. The method of claim 14 wherein each read commit message includes the new timestamp, a most recent version of the write timestamp selected from write timestamps provided in the read confirmations, and the corresponding version of the data.

16. The method of claim 15 further comprising receiving commit confirmations from at least a third majority of the storage devices of the replica set, each commit confirmation indicating that the new timestamp is no earlier than a most recent read timestamp, that the most recent version of the write timestamp is no earlier than a local version of write timestamp, that the corresponding version of the data has been saved, and that the new timestamp has been saved as a newer version of the write timestamp.

17. The method of claim 16 further comprising providing the data to a client.

18. The method of claim 1 further comprising issuing optimistic read messages to the storage devices of the replica set, at least one of the optimistic read messages requesting the write timestamp, the read timestamp, and the data, wherein remaining optimistic read messages request the write timestamp and the read timestamp.

19. The method of claim 18 wherein optimistic read replies are received from all of the storage devices of the replica set, the optimistic read replies of the majority providing matching write timestamps, and the optimistic read replies of the majority providing matching read timestamps.

20. The method of claim 19 further comprising providing the data to a client.

21. The method of claim 18 wherein optimistic read replies are received from less than all of the storage devices of the replica set or at least one of the optimistic read replies provides a non-matching write timestamp relative to write timestamps provided by others of the optimistic read replies or at least one of the optimistic read replies provides a non-matching read timestamp relative to read timestamps provided by others of the optimistic read replies.

22. The method of claim 21 further comprising generating a new timestamp and issuing read messages to the storage devices of the replica set, each read message including the new timestamp.

23. The method of claim 22 further comprising receiving read confirmations from at least a second majority of the storage devices of the replica set, each read confirmation including a write timestamp and a corresponding version of the data, the read confirmations indicating that the new timestamp is no earlier than the write timestamp for the data, that the new timestamp is no earlier than a most recent version of a read timestamp for the data, and that the new timestamp has been saved as a new version of the read timestamp for the data.

24. The method of claim 23 further comprising issuing read commit messages to the storage devices of the replica set, each read commit message including the new timestamp, a most recent version of the write timestamp selected from write timestamps provided in the read confirmations, and the corresponding version of the data.

25. The method of claim 24 further comprising receiving commit confirmations from at least a third majority of the storage devices of the replica set, each commit confirmation indicating that the new timestamp is no earlier than a most recent read timestamp, that the most recent version of the write timestamp is no earlier than a local version of the write timestamp, that the corresponding version of the data has been saved, and that the new timestamp has been saved as a newer version of the write timestamp.

26. A computer-implemented method reading data comprising the steps of:
   generating a timestamp;
   issuing read messages to storage devices of a replica set, each read message including the timestamp;
   receiving read confirmations from at least a first majority of the storage devices of the replica set, each read confirmation including a write timestamp and a corresponding version of the data, the read confirmations indicating that the timestamp is no earlier than the write timestamp for the data, that the timestamp is no earlier than a most recent version of a read timestamp for the data, and that the timestamp has been saved as a new version of the read timestamp for the data;
   issuing read commit messages to the storage devices of the replica set, each read commit message including the timestamp, a most recent version of the write timestamp selected from write timestamps provided in the read confirmations, and the corresponding version of the data; and
   receiving commit confirmations from at least a second majority of the storage devices of the replica set, each commit confirmation from a storage device indicating that the timestamp is no earlier than the most recent version of the read timestamp, that the most recent version of the write timestamp is no earlier than a local version of the write timestamp, that the corresponding version of the data has been saved, and that the timestamp has been saved as a newer version of the write timestamp.

27. The method of claim 26 wherein a coordinator performs the steps of issuing the read messages, receiving the read replies, issuing the read commit messages, and receiving the commit confirmations.

28. The method of claim 27 wherein the coordinator is one of the storage devices of the replica set.

29. The method of claim 27 wherein generating the timestamp comprises receiving the timestamp from a client, the method further comprising the coordinator receiving a read request from the client.

30. The method of claim 27 wherein the coordinator performs the step of generating the timestamp.

31. The method of claim 27 wherein, upon receiving the commit confirmations from at least the second majority of the storage devices of the replica set, the coordinator provides the data to the client.

32. The method of claim 26 further comprising generating a new timestamp.

33. The method of claim 32 further comprising issuing write messages to the storage devices of the replica set, each write message including a newer version of the data and the new timestamp.

34. The method of claim 33 further comprising receiving write confirmations from at least a third majority of the storage devices of the replica set, each write confirmation indicating that the new timestamp is no earlier than the most recent version of the write timestamp, that the new timestamp is no earlier than the most recent version of the read timestamp, and that the new timestamp has been saved as a newest version of the write timestamp.

35. A computer readable medium having stored thereon computer code which when executed implements a method of writing data, the method of writing the data comprising the steps of:
   generating a timestamp or receiving the timestamp;
   issuing write messages to a replica set of storage devices, each write message including the data and the timestamp; and
   receiving write confirmations from at least a majority of the storage devices of the replica set, each write confirmation indicating that the timestamp is no earlier than a most recent version of a write timestamp, that the timestamp is no earlier than a most recent version of a read timestamp, and that the timestamp has been saved as a new version of the write timestamp.

36. A computer readable medium having stored thereon computer code which when executed implements a method of reading data, the method of reading the data comprising the steps of:
   generating a timestamp or receiving the timestamp;
   issuing read messages to storage devices of a replica set, each read message including the timestamp;
   receiving read confirmations from at least a first majority of the storage devices of the replica set, each read confirmation including a write timestamp and a corresponding version of the data, the read confirmations indicating that the timestamp is no earlier than the write timestamp for the data, that the timestamp is no earlier than a most recent version of a read timestamp for the data, and that the timestamp has been saved as a new version of the read timestamp for the data;
   issuing read commit messages to the storage devices of the replica set, each read commit message including the timestamp, a most recent version of the write timestamp selected from write timestamps provided in the read confirmations, and the corresponding version of the data; and receiving commit confirmations from at least a second majority of the storage devices of the replica set, each commit confirmation from a storage device indicating that the timestamp is no earlier than the most recent version of the read timestamp, that the most recent version of the write timestamp is no earlier than a local version of the write timestamp, that the corresponding version of the data has been saved, and that the timestamp has been saved as a newer version of the write timestamp.

* * * * *